(12) United States Patent
Phillips

(10) Patent No.: US 6,254,919 B1
(45) Date of Patent: Jul. 3, 2001

(54) PREPARATION OF SHELF STABLE BLUEBERRIES AND MOIST SHELF STABLE BLUEBERRY PRODUCT

(75) Inventor: Robert M. Phillips, Sullivan, ME (US)

(73) Assignee: Maine Wild Blueberry Company, Machias, ME (US)

( * ) Notice: Subject to any disclaimer, the term of this patent is extended or adjusted under 35 U.S.C. 154(b) by 0 days.

(21) Appl. No.: 09/342,543

(22) Filed: Jun. 29, 1999

(51) Int. Cl.⁷ .................................................. A23B 7/08
(52) U.S. Cl. .......................... 426/640; 426/324; 426/554; 426/619; 426/639
(58) Field of Search ..................... 426/615, 639, 426/619, 554, 112, 115, 120, 390, 418, 324

(56) References Cited

U.S. PATENT DOCUMENTS

| | | | |
|---|---|---|---|
| 3,202,514 | 8/1965 | Burgess et al. | 99/2 |
| 3,516,836 * | 6/1970 | Shea . | |
| 3,563,768 * | 2/1971 | Melnick | 426/120 |
| 3,671,264 * | 6/1972 | Drews | 426/554 |
| 4,103,035 | 7/1978 | Fulger et al. | 426/321 |
| 4,298,623 * | 11/1981 | Anderson | 426/639 |
| 4,350,711 | 9/1982 | Kahn et al. | 426/102 |
| 4,364,968 | 12/1982 | Waitman et al. | 426/639 |
| 4,390,550 | 6/1983 | Kahn | 426/102 |
| 4,515,824 * | 5/1985 | Blake | 425/554 |
| 4,542,033 * | 9/1985 | Agarwala | 426/639 |
| 4,551,348 | 11/1985 | O'Mahony et al. | 426/639 |
| 4,713,252 * | 12/1987 | Jamail | 426/640 |
| 4,775,545 | 10/1988 | Augustine et al. | 426/639 |
| 4,814,190 * | 3/1989 | Jamail | 426/640 |
| 4,883,674 * | 11/1989 | Fan | 426/112 |
| 5,000,972 | 3/1991 | Hsieh et al. | 426/302 |
| 5,167,973 * | 12/1992 | Snyder | 426/120 |
| 5,223,287 | 6/1993 | Kearns et al. | 426/102 |
| 5,320,861 | 6/1994 | Mantius et al. | 426/599 |
| 5,364,643 | 11/1994 | Morimoto et al. | 426/102 |
| 5,518,744 * | 5/1996 | Kaeser | 426/115 |
| 5,534,280 | 7/1996 | Welch | 426/321 |
| 5,690,725 * | 11/1997 | Tucker | 426/639 |
| 5,718,931 | 2/1998 | Walter et al. | 426/102 |
| 5,718,939 | 2/1998 | Nugent | 426/615 |
| 6,013,294 * | 1/2000 | Bunke | 426/120 |

FOREIGN PATENT DOCUMENTS

| | | | |
|---|---|---|---|
| 1272065 * | 9/1985 | (CA) . | |
| 1305891 * | 9/1985 | (CA) . | |
| 2218962 * | 11/1989 | (GB) . | |
| WO 98/03072 * | 1/1998 | (WO) . | |

OTHER PUBLICATIONS

Jay 1978 Modern Food Microbiology 2nd ed. D. Van Nostrand Co. New York p. 239–250.*
Ranken & Kell 1988 Food Industries Manual 23$^{th}$ ed. New York p. 405, 406, 459–473, 476.*
Peterson & Johnson 1976 Encyclopedia of Food Science AVI Publishing Co. Inc Westport CT.*

* cited by examiner

Primary Examiner—Carolyn Paden
(74) Attorney, Agent, or Firm—Ware, Fressola, Van Der Sluys & Adolphson LLP

(57) ABSTRACT

A moist, shelf-stable blueberry product is prepared in a form suitable for packaging separately with muffin mixes, breakfast cereal and the like. The preferred product has a moisture content of from about 30 to about 50% and an $A_w$ of from about 0.80 to about 0.85. The process entails immersing blueberries in two baths, the first of sugar syrup and the second containing an aqueous food acid. Following removal from the baths, the blueberries are rinsed and then dried with hot air at a temperature effective for pasteurization.

5 Claims, 1 Drawing Sheet

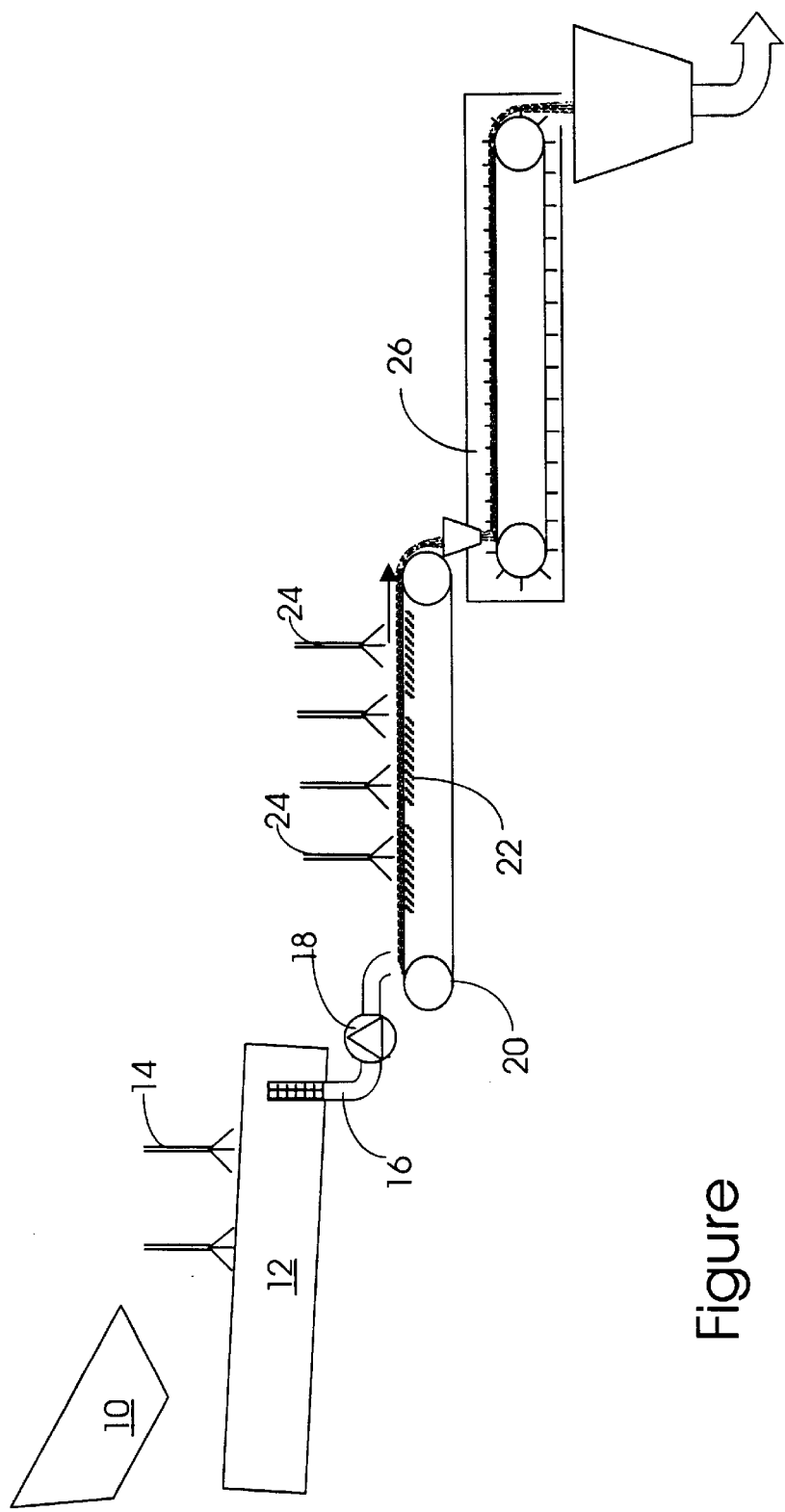
Figure

PREPARATION OF SHELF STABLE BLUEBERRIES AND MOIST SHELF STABLE BLUEBERRY PRODUCT

TECHNICAL FIELD

The invention relates to methods that enable the production and packaging of blueberries.

Blueberry muffins are a breakfast and snack favorite of thousands of people. They are especially good if made with fresh wild blueberries. Unfortunately, wild blueberries are in season for only limited periods of time. Frozen blueberries are of good quality, but cannot be conveniently packaged with a muffin mix. Such mixes usually include a can of blueberries in liquid. The liquid will typically amount to 50% of the canned weight and, due to heat processing, the quality of the fruit is somewhat degraded. In some cases, the blueberries lose most of their texture by the time baking is completed.

Blueberries are also a favorite with breakfast cereals. However, drying them to the degree necessary for packaging with the cereal makes them chewy. The canned blueberries can't practically be packaged with the cereal because that would require one can per serving.

In addition, blueberries have been identified as an unusually good source of antioxidants, and it would be desirable to find new ways to ensure a year around source of blueberries suitable for a variety of food applications.

There is a current need for improving the quality of blueberries for use in muffin mixes, breakfast cereals, and the like and ensuring a year around source of blueberries suitable for a variety of food applications.

BACKGROUND ART

Blueberries have been the subjects of several prior art processes, but to date they are available in only a few forms. All less than preferred for muffin mixes, breakfast cereals and the like. Thus, blueberries are currently considered under utilized for their beneficial healthy-diet advantages.

In U.S. Pat. No. 4,350,711, Kahn, et al., treat blueberries among other fruits. They infuse fruits with fructose sugar solids. The resulting products are said to remain non-crystalline at freezer temperatures. The fruit is infused by immersing it in two or more sugar containing solutes baths of gradually increasing sugar concentration so that the solids content of the fruit is increased in a step-wise and gradual manner to the level of about 32 to 55 percent by weight. The baths can also contain other materials such as polyhydric alcohols and texture-improving additives like low methoxyl pectin or calcium hydroxide. In the one example on blueberries, the fruit contained about 38% infused solids after soaking heated, under vacuum prior to frozen storage.

In U.S. Pat. No. 4,390,550, Kahn, et al., disclose Infusing fruit (blueberries not mentioned) with sugar solutes to reduce the water activity by creating sites for removing part of the water content and bathing the fruit in sugar bath to infuse sugar therein. The bath is a fructose-containing corn syrup of about 70 to 80% sugar solids with 40 to 90% being fructose and/or dextrose, resulting in fruit having a water activity of 0.45 to 0.65. The fruit is added to cereal.

In another approach, in U.S. Pat. No. 4,364,968, Waitman, et al., are primarily concerned with preparing a dried grape product, but mention blueberries in a long list of fruits that can be processed. Grapes are processed to remain soft with minimal color, flavor, or textural changes over extended periods of time. The process combines the use of enzyme inactivation and a hydrophilic carbohydrate infusion into fresh grapes, followed by drying the grapes to a moisture content of less than 30%. The dry grapes are then converted into simulated raisins by storing them for a period of time under conditions of controlled humidity and elevated temperature effective to provide a darkening in color and to develop a natural raisin-like flavor within the grapes without further drying.

In U.S. Pat. No. 4,103,035, to Fulger, et al., a process is disclosed to soften raisins to make them more palatable in cereal, without causing the cereal to become soggy. To do this, it had been common practice to add a humectant, but it was difficult to get the humectant to penetrate the raisins. They proposed first treating the raisins with a hot, weak acid and then washing with glycerol, sorbitol, or other humectant, followed by water washing and drying to a moisture content of about from 12% to 20%.

In another infusion process, O'Mahoney, et al, point out in U.S. Pat. No. 4,551,348, that rapidly infusing fruit with sugar solutes can be achieved in an infusion bath which is maintained at a substantially constant solutes concentration and viscosity. During the course of the infusion process infusion solution is removed, exposed to an enzyme and concentrated before returning the concentrated solution to the original infusion bath.

Augustine, et al., in U.S. Pat. No. 4,775,545, describe the preparation of a sweetened fruit having a low water activity relative to its moisture content. A dry fruit (from a long list including blueberries) is bathed in an aqueous sugar solution having about 70 to 95 weight percent sugar, at least about 75 weight percent of which is fructose. The bath preferably includes an alkaline calcium compound.

In U.S. Pat. No. 5,000,972, Nafisi-Movaghar describes a process for drying fruits that includes applying vacuum while infusing with a sugar solution containing an acid and an antimicrobial agent. The objectives seem to be centered on the prevention of enzymatic and nonenzymatic browning without the use of sulfites and blueberries are not among the fruits listed for treatment.

In U.S. Pat. No. 5,223,287, Kearns, et al., prepare dried fruits said to have improved handling and physical properties by coating the fruits with a finely-divided, specially-prepared calcium citrate reaction product. The dried fruits are suitable for use with dry cereals.

In U.S. Pat. No. 5,320,861, Mantius, et al., describe extraction, especially of firm fruit such as cranberries, of low tannin juices by using a countercurrent extractor. Reinfusion of decharacterized, extracted fruit pieces with infusion syrups, such as juices from fruits (e.g., blueberries) other than that extracted, produces fruit food products of various flavors.

In U.S. Pat. No. 5,364,643, Morimoto, et al., describe a process for infusing dried fruits by coating the dried fruits with an edible humectant-containing gel. The resulting infused products are said to be relatively undamaged and high in flavor.

In U.S. Pat. No. 5,534,280, Welch describes a process for treating a solid food product having water soluble-and water-insoluble volatile materials soluble in alcohol and ether. The process includes cutting the product into pieces, placing the pieces in a volume of water containing an anti-oxidant, and drawing a vacuum on the pieces in the water to pull air out of the cells of the pieces. The vacuum is released to cause water and the anti-oxidant to enter the cells of the pieces. The pieces are then heated to dry them and to drive off a mixture of water vapor or steam and the volatiles. The mixture is directed through an adsorbent to remove the volatiles from the mixture. The volatiles are fractionated by a complex process and at least a portion are added back to the product.

Because of the problems with packaging fruit with cereal, Walter, et al., in U.S. Pat. No. 5,718,931, describe the preparation of low-fat, coated dry fabricated fruit pieces to simulate dried fruit pieces for use as a particulate additive in a ready-to-eat cereal. The coated fruit pieces include about 25% to 50% of a low-moisture, gelled center having high humectant levels and about 50% to 75% of a base coating comprising dried fruit material in particulate form and about 1% to 10% of thin film top coat.

And, in U.S. Pat. No. 5,718,939, Nugent describes infusing sugar into fruits and vegetables by treating them with water to cause osmotic rupturing of at least a portion of the cells before infusing it with a concentrated syrup. Infusion is conducted in a stage-wise manner to result in an infused product having a Brix level from about 40° to about 52°.

The art is awaiting the development of a process which takes into account the unique properties of blueberries and enables the production of these in a partially-dried, tender, appetizing and shelf-stable form, suitable for a variety of purposes, such as packaging with baking mixes, such as for muffins, pancakes, cakes, and the like, and with dry ready-to-eat breakfast cereals.

DISCLOSURE OF INVENTION

It is an object of the invention to provide a process for preparing shelf-stable blueberries.

It is yet another object of the invention to produce a shelf-stable wild blueberry to replace the canned variety for muffin mixes.

It is a further object of the invention to provide an ingredient for baked products such as bagels, cakes and cookies that offer good texture, and flavor along with shelf stability.

It is still another object of the invention to produce blueberries for cereal that can be conveniently included as a separate package with ready-to-eat breakfast cereal.

It is another object of the invention to enable the preparation of blueberries in a convenient form for snacking, without the bother of the can or the concern for freshness.

These and other objects are achieved by the present invention, which provides an improved process for preparing blueberries, and other acid fruits such as tart cherries and apples, in a partially-dried, tender, appetizing and shelf-stable form, suitable for packaging with baked goods mixes and dry ready-to-eat breakfast cereals.

According to one embodiment, the invention provides a method for preparing a moist, shelf-stable acid fruit (preferably, blueberries, but also cranberries, tart cherries and apples) product, the product having a moisture content of from about 30 to 50% and an $A_w$ of from about 0.50 to about 0.65, the process comprising: immersing fruit in a bath of sugar syrup having a sugar concentration of at least 60° Brix and predominantly comprised of monosaccharides; maintaining the immersion for at least 24 hours; removing the fruit from contact with the sugar syrup; immersing the fruit in a bath containing aqueous sugar solution and food acid, the bath having an acid concentration of at least 0.1%; rinsing the fruit; and contacting the fruit with a flow of hot air to dry it to a moisture content of about 30 to about 50% and an $A_w$ of from about 0.50 to about 0.65, while heating it to pasteurization temperature.

BRIEF DESCRIPTION OF THE DRAWINGS

The invention will be better understood and its advantages more apparent from the following detailed description, especially when read in light of the accompanying drawing, wherein:

The FIGURE is a flow diagram showing a preferred embodiment of the invention.

DETAILED DESCRIPTION OF A PREFERRED EMBODIMENT

In this description, the term blueberry is meant to include native wild blueberries as well as cultivated varieties. The invention has particular application and advantages for wild blueberries, but is equally applicable to other acid fruits such as cranberries, tart cherries and apples. The following description will be directed to wild blueberries as the preferred embodiment.

Reference to the FIGURE shows a cart 10 or other suitable means for feeding blueberries into infusion tank 12. The blueberries will be held in the infusion tank 12 in contact with two different infusion solutions, in sequence. It is within the scope of the invention to provide a plurality of tanks in sequence. The tanks are equipped with suitable inlets and outlets for the infusion liquids used in the baths. Spray heads 14 are used as necessary to wet the tops of the blueberries, which tend to float. The infusion liquid can be withdrawn from the bottom of tank 12 and circulated to the spray heads 14 by pumps and lines, not shown.

The first infusion solution comprises a solution of sugar syrup having a sugar concentration of at least 40° Brix, preferably 45 to 55° Brix, and is predominantly comprised of monosaccharides. The applicable analytic procedures for determining this value and the others referred to herein are set forth in the Example below. Among the preferred monosaccharides are corn syrup, dextrose, honey, fructose, high fructose corn syrup, mixtures of these, and the like. Excluded from use in predominant proportion are those sugars that are crystallizing sugars, such as sucrose, under the conditions of use. Crystallizing sugars are undesirable to the extent that they recrystallize within the blueberries. This has the consequences of deteriorated texture and an increase in the amount of free water within the blueberries. The free water can then escape from the interior of the blueberries, causing them to dry and creating the possibility for microbial growth in condensation within the package.

Contact between the blueberries and the first infusion liquid is maintained until they have an internal sugar content of from about 25 to 55° Brix, as measured by the procedure outlined in the Example. This stage of infusion typically takes from 1 to 3 days, depending on various factors including size of the blueberries, whether fresh or frozen, bath temperature, bath concentration, ambient temperatures, and the like.

The second infusion solution comprises sugar as described above, but importantly it contains an acidulent and an antimicrobial agent, such as any antimycotic suitable for food use. See, for example, U.S. Pat. No. 3,202,514 to Burgess, et al. A preferred type of antimycotic is sorbic acid and its salts, especially potassium sorbate. Typical of the food acidulents which can be employed are adipic, citric, fumaric, malic, tartaric, and like acids. Citric acid is one preferred acid as is a combination of malic and tartaric. Other conventional food acidulents may, of course, be employed. According to this invention, one or a combination of these edible acids is employed at concentration a effective to achieve the target acidity within a practical infusion period, e.g., of from about 0.1 to about 0.3%. Preferably the acid is present at a level of from about 0.1 to about 0.2%. Suitable buffering agents can be employed, when using these or higher acid levels, to obtain a solution pH below about 3.5, preferably within the range of from 2.7 to about 3.0.

Contact between the blueberries and the second infusion liquid is maintained until they have an internal pH of from about 3.0 to 3.4. This typically is about of the same duration as the first infusion, from 1.5 to 3 days, again depending on various factors including size of the blueberries, sugar content of the blueberries, whether fresh or frozen, bath temperature, bath concentration, ambient temperature, and the like.

Following infusion, the blueberries are pumped from the tank 12 via line 16 and pump 18 to belt 20 for draining with the aid of shakers 22 and water sprays 24. After the blueberries have been substantially freed of external syrup, they are conveyed into dryer 26 wherein they are dried to a typical final moisture content of from about 30 to about 45%, preferably from about 33 to about 36%. This moisture content is highly desirable from the standpoint of the excellent texture it imparts to the blueberries while also retaining a surprising degree of juiciness, considered a key parameter in acceptability. The berries are also heated to a temperature suitable for pasteurization, e.g., from about 80° to about 95° C.

The moisture content of the product blueberries is sufficient and the degree of reduction according to the invention cannot by itself impart shelf stability. However, the blueberries of the invention are rendered shelf-stable due to the presence of the heat process, sugar, acid and antimycotic. The sugar and acid have the effect of increasing the osmotic pressure of the water in the blueberries. Hence, bacteriostasis is achieved in the final product. Typically, this condition is expressed in terms of the water activity or $A_w$ of the product, which is the ratio of the vapor pressure of the water contained in blueberries to the vapor pressure of pure water measured at the same temperature. Typically, the $A_w$ of blueberries will be typically be below about 0.85 and above 0.75, e.g., within the range of from about 0.80 to about 0.85, preferably from about 0.80 to about 0.82.

From the drier 26, the blueberries are conveyed to any suitable packaging machine. Preferably, they are fed into individual plastic containers, such as pouches or tubs, having a coated or laminated structure that effectively blocks transmission of oxygen or moisture into or out of the container. To assure maximum freshness, the containers are preferably flushed with nitrogen or other oxygen-free gas prior to sealing.

Product prepared and packaged in this manner can be placed inside of a box or bag containing muffin or other baked goods mix or ready-to-eat cereal, or the like. In this manner, the use of either a can or frozen package is avoided, permitting the product to be stored on the shelf for extended time periods and then conveniently opened and used with the muffin mix or cereal. A typical baking mix according to the invention will include flour, leavening and a package of blueberries prepared by the method above, and can contain optional ingredients as desired.

EXAMPLE

The following Example is provided to further illustrate and explain a preferred form of the invention and are not to be taken as limiting in any regard. Unless otherwise indicated, all parts and percentages are by weight.

This example presents the results of a plant trial. Four hundred pounds of size graded small wild blueberries were placed in tank with 960 pounds of 45° Brix first infusion syrup. After about 30 hours of infusion, the first infusion syrup was drained off and replaced with the a similar quantity of second infusion syrup, additionally containing 1 pound of potassium sorbate, 3.5 pounds of malic acid and 5.3 pounds of tartaric acid. Following infusion for about 40 hours, the second infusion syrup was drained off, the blueberries were rinsed and the rinsed blueberries were dried. The drier was a Guptill, set at a feeder speed of 1685 rpm, a drier conveyor speed of 1725 rpm, a first heat zone temperature of about 82° C., with no heat in a second zone and a cooling fan in a final cooling zone. The product had the following properties. Test methods are set out below the table.

| Property | Value |
| --- | --- |
| $A_W$ | 0.83–0.84 |
| Moisture | 33.76% |
| PH | 2.87–2.95 |
| Dissolved Solids | 64–67% |
| Total Acidity, calculated as citric acid | 1.11–1.15 |
| Color | Uniform and deep blue/purple |

A. Procedure for Determining Water Activity, $A_w$

Scope

This procedure is applicable for the determination of the water activity level in a sample of dried or semi dried fruit products. Water activity is a measurement of the water that is available in a food product that will support microbial growth.

Apparatus

Aqua Lab Model CX2 Water Activity Testing Machine

Scissors

Sample Cups

Procedure

1. Standardize the Aqua Lab machine using a saturated sodium chloride solution. Put solution into a sample cup and insert it into the machine. Turn the adjusting nob to the right until the machine begins a beeping sound. This should take about 3–5 minutes. The solution should read between 0.754–0.757. if this reading does not appear, take off the cover and clean the sensing head with distilled water and wipe dry with a Kim-wipe and repeat the test procedure.
2. Using scissors, cut up enough berries to be tested to fill a sample cup no more that half full.
3. Put the sample cup into the machine and turn the knob to the right until the machine begins to make a beeping sound.
4. When the machine makes a continual beeping sound, the test is complete. Read the water activity value on the digital dial and record.

B. Procedure for Determining the Moisture Content of Dried Fruit

Scope

This procedure is applicable for the determination of the moisture content of dried or semi dried fruit products. The moisture is determined by difference in weight after the water has been evaporated using a Denver Instrument Company Moisture Analyzer.

Apparatus

Denver Instrument Company Moisture Analyzer

Mortar and pestle
Paper towels
Digital scale

Procedure

1. Calibrate the moisture analyzer. Lift the heater hood and place an empty disposable pan with a quartz pad into the heater section. Close the hood. Press the "mode" key until calibration appears, then press "enter". Press "tare" key to tare pan and pad. Display will now show calibration. Place a 50 gram weight on the pan and press "enter" now. When calibration is complete, the display will show calibration done.
2. Obtain 6 samples from different locations of the product to be tested.
3. Rinse the sample fruit with cold water, drain and blot with a paper towel to remove surface moisture.
4. Put sample in mortar and using the pestle, mash the berries well.
5. Weigh empty disposable pan and quartz pad on the Moisture Analyzer scale. Press "tare".
6. Put the disposable pan and quartz pad on the digital scale and press "tare".
7. Put onto the pan 1.5 grams of material to be tested from the mortar.
8. Lift the hood of the Moisture Analyzer and place the pad and pan containing the sample into the analyzer, close the hood and press the "start" button.
9. The results will print out on the machine when the moisture has all been evaporated from the sample.

C. Procedure for pH Calculation

Scope

This procedure is applicable for the determination of the pH of food materials that are dispersed/dissolved in a water solution. The pH of the solution is defined as $pH=-\log aH$, where aH is the activity of the hydrogen ion in solution.

| Apparatus | |
|---|---|
| pH Meter | Fisher Scientific Accumet Model 15 pH Meter |
| Beakers | 250 ml |
| Magnetic Stirring Plate | |
| Balance | Accurate to 0.01 gm |
| Buffer Solution | Fisher Color Coded Solutions or Equivalent |
| Glass Stirring Rod | 6 inches long |
| Chemicals | |
| Water | Carbonate Free |
| Buffer Solutions | Fisher Color Coded or Equivalent |

General

The pH meter offers a variety of options for pH measurement. Before beginning pH analysis, the operator must implement the appropriate options starting on page 13 of the operating manual. The operator must be thoroughly familiar with the manual prior to making any pH measurements.

Standardization of the pH Meter

The pH meter must be standardized at the beginning of each shift following the procedure on page 15 of the manual using the two point standardization procedure.

Operation

1. Select a sample from the lot to be tested making sure that the sample is representative of the product to be analyzed. The sample should be approximately 50 grams.
2. Accurately weigh 15 grams of material into a clean and dry 250 ml beaker.
3. Add 150 ml of carbonate free water. Using a glass stirring rod, carefully break-up the sample material to facilitate dissolving/dispersion of product in the water.
4. Leaving the stirring rod in the beaker, carefully add a clean magnetic stirring bar to the beaker and place the beaker on the base unit.
5. Turn the stirrer on slowly avoiding splashing and incorporating air into the solution.
6. Carefully lower the pH electrode into the solution in the beaker. Be careful that the magnetic stirrer does not come in contact with the electrode.
7. Read pH of the solution by pressing the pH button on the meter. Record the meter reading.
8. Press "standby" button and raise the electrode from the beaker and rinse it thoroughly with distilled water. Wipe the electrode with a clean tissue.
9. Place the electrode in a beaker of distilled water.
10. At the end of the day, place the electrode in a beaker of storage solution for overnight.

D. Procedure for Determining Dissolved Solids

Scope

This procedure is applicable for the determination of dissolved solids in a sample of dried or semi dried fruit products using a refractometer.

Apparatus

Refractometer with a scale from 0–55 degrees Brix
Scissors
Mixer
Spoon
Kim wipes
Distilled water
Beaker (250 ml)

Procedure

1. Standardize the refractometer using distilled water
2. Weigh out 10 grams of fruit to be tested
3. Using scissors, cut up 10 grams of fruit into a 250 ml beaker.
4. Add 20 ml of boiling water and allow 10 minutes for dehydration.
5. Mix the product with a hand held mixer for 15–30 seconds.
6. Stir well and mash any remaining pieces with a spoon.
7. Put a small sample of the mixture on a Kim-wipe and gently squeeze until several drops of liquid drop onto the prism of the refractometer.
8. Read the refractometer and record the reading.
9. Repeat step 8 two additional times and record the readings.
10. Take an average of the three readings to determine the Brix reading of the sample.
11. Clean the refractometer prism with distilled water and wipe dry with a Kim-wipe.

E. Procedure for Determining Total Acidity

Scope

This procedure is applicable for the determination of the total amount of acid present in an aqueous food sample by titrating with a standard alkali (sodium hydroxide) to a given pH end point.

| Apparatus | |
|---|---|
| pH Meter | Fisher Scientific Accumet Model 15 |
| Magnetic Stirring Plate | |
| Magnetic Stirring Bar | |
| Balance Scale | Relative accuracy to 0.1 grams |
| Burette | Graduated in 0.1 ml |
| Beaker | 250 ml capacity |

| | |
|---|---|
| Standard Buffer Solutions | |
| Sodium Hydroxide | 0.1 Normality |
| Conversion Chart | ml. of alkali/total acidity or multiplication factor for specific acid |

Procedure
1. Standardize the pH meter using pH4 and pH7 buffer solutions.
2. Using the balance, accurately weigh a 15 gram sample of homogeneous semi solid fruit, into a 250 ml. beaker.
3. Add 150 ml of distilled water.
4. Carefully place the Teflon coated stirring bar into the beaker. Put the beaker on top of the magnetic stirrer and turn the magnetic stirrer on to gently mix the solution. Carefully immerse the electrode of the pH meter into the solution being aware of not letting the electrode to come in contact with the magnetic stirring bar.
5. While continuing steady agitation, titrate with 0.1 N sodium Hydroxide solution to an end point of 8.1 on the pH meter. As the end point is approached, the alkali solution should be added very slowly with caution. Read the volume of alkali used and calculate the total acidity.
6. Discard the solution in the beaker being careful to recover the magnetic stirring rod. Rinse the rod and beaker with water and turn the beaker upside down to dry Calculation Divide the volume of titrant used (sodium hydroxide) by 1.5 and multiply that number by the constant (F) of the desired acid. Volume (mls)/1.5×(F)=gm/100 gms F values for various acids per a 10 gram sample are:

| | |
|---|---|
| Acetic Acid | 0.060 |
| Citric Acid | 0.064 |
| Fumaric Acid | 0.058 |
| Lactic Acid | 0.090 |
| Malic Acid | 0.067 |
| Tartaric Acid | 0.075 |

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

What is claimed is:

1. A method for preparing a moist, shelf-stable blueberry product, the product having a moisture content of from about 30 to 50% and an $A_w$ of from about 0.80 to about 0.85, the process comprising:

immersing blueberries in a bath of sugar syrup having a sugar concentration of at least 60° Brix and predominantly comprised of monosaccharides;

maintaining the immersion for at least 24 hours;

removing the blueberries from contact with the sugar syrup;

immersing blueberries in a bath containing aqueous sugar solution and food acid, the bath having an acid concentration of at least 0.1%;

rinsing the blueberries; and contacting the blueberries with a flow of hot air to dry them to a moisture content of about 30 to about 50% and an $A_w$ of from about 0.80 to about 0.85, while heating them to pasteurization temperature.

2. A method according to claim 1 wherein the blueberries are packaged in a plastic container which has been flushed with an oxygen-free gas.

3. A method for preparing a moist, shelf-stable acid fruit product, comprising:

immersing the fruit in a bath of sugar syrup having a sugar concentration of at least 60° Brix and predominantly comprised of monosaccharides;

maintaining the immersion for at least 24 hours;

removing the fruit from contact with the sugar syrup;

immersing the fruit in a second bath containing aqueous sugar solution and food acid, the bath having an acid concentration of at least 0.1%;

rinsing the fruit; and contacting the fruit with a flow of hot air to partially dry them and reduce the $A_w$ less than about 0.85, while heating the fruit to pasteurization temperature.

4. A method according to claim 3 wherein the fruit is selected from the group consisting of tart cherries, apples, blueberries and cranberries.

5. A method according to claim 3 wherein the fruit is packaged in a plastic container which has been flushed with an oxygen-free gas.

* * * * *